Figure 1:
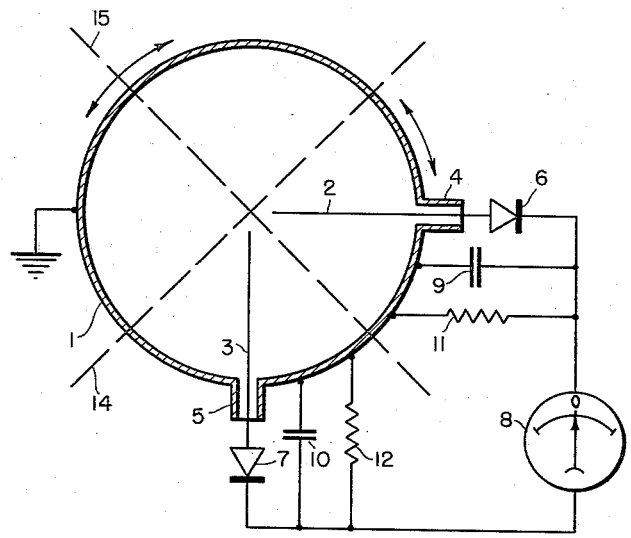

July 4, 1961  G. PAPP  2,991,417
WAVE POLARIZATION DETECTING APPARATUS
Original Filed Jan. 6, 1955  2 Sheets-Sheet 1

INVENTOR.
GEORGE PAPP
BY
George A. Gust
ATTORNEY

INVENTOR.
GEORGE PAPP
BY
*George R. Gust*
ATTORNEY

United States Patent Office 2,991,417
Patented July 4, 1961

2,991,417
WAVE POLARIZATION DETECTING APPARATUS
George Papp, Fort Wayne, Ind., assignor, by mesne assignments, to the United States of America as represented by the Secretary of the Navy
Original application Jan. 6, 1955, Ser. No. 480,174. Divided and this application May 5, 1959, Ser. No. 827,983
3 Claims. (Cl. 324—95)

The present invention relates to a wave polarization detecting apparatus, and more particularly to an apparatus which is capable of determining accurately the polarization state of a wave, whether it be linear, elliptical or circular.

This application is a division of copending U.S. patent application Serial No. 480,174, filed January 6, 1955, by the present applicant, and now abandoned.

It is well-known in the art that radio frequency waves may be polarized linearly (in a single plane), elliptically, or circularly. In the case of linear polarization, the electric wave is confined in a single plane, which extends in the direction of wave propagation. This plane may be oriented to any angle; common wave polarization being in a vertical plane. Circular wave propagation may assume either clockwise or counterclockwise rotation, as is true of an elliptical wave. It is obvious that the major axis of the elliptical wave may be oriented in space as desired, and the rotation of the wave in the elliptical pattern may be either clockwise or counterclockwise.

It is often desirable to determine the character and sense of a wave; that is, to know whether the wave is linear, elliptical or circular, and the sense of orientation and rotation. Concerning the linear and elliptical waves, it is necessary to know the plane of polarization. As to the elliptical and circular waves, it is necessary to know the sense of wave rotation.

In view of the foregoing, it is an object of this invention to provide a wave polarization-detecting apparatus for accomplishing the determniing features of the preceding paragraph.

It is another object of this invention to provide a detecting apparatus which will indicate the angle of polarization of both plane polarized and elliptical waves.

It is still another object to provide a detecting apparatus which will indicate the direction of wave rotation of both elliptical and circular waves.

It is yet another object of this invention to provide a wave-detecting apparatus incorporated into a servo mechanism which will automatically orient itself in parallelism with a plane polarized or elliptical wave.

According to one embodiment of this invention, two detectors are oriented at an angle to each other in a circular wave guide or a coaxial line in a single plane normal to the direction of wave propagation. In the case of a plane or elliptically polarized wave, the wave guide is rotated about its axis until the detectors produce equal amplitude signals. The plane of polarization in this position bisects the angle between the detectors or is at right angles to the bisecting line. By use of two additional detectors which coincide with these ambiguous directions, the exact sense of the wave is determined by observing the amplitudes of the two signals produced thereby. The larger signal will indicate coincidence with wave orientation, while the position of the detector producing the smaller signal indicates the position of a plane at right angles to polarization.

For a better understanding of the invention, together with other and further objects thereof, reference is made to the following description taken in connection with the accompanying drawings, the scope of the invention being defined by the appended claims.

Figure 2:
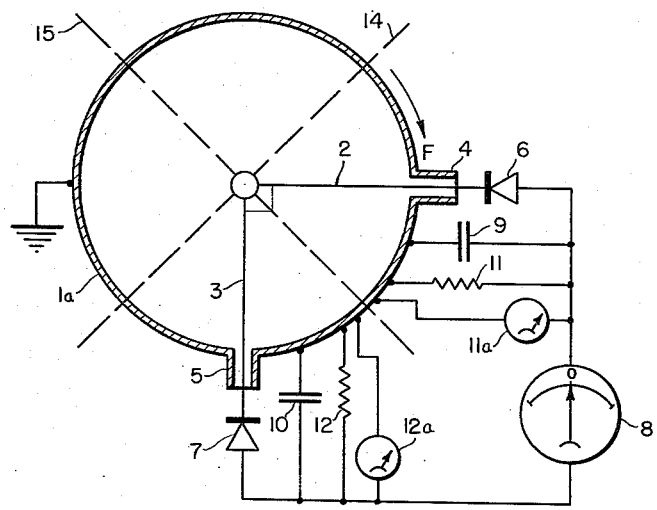
Figure 3:
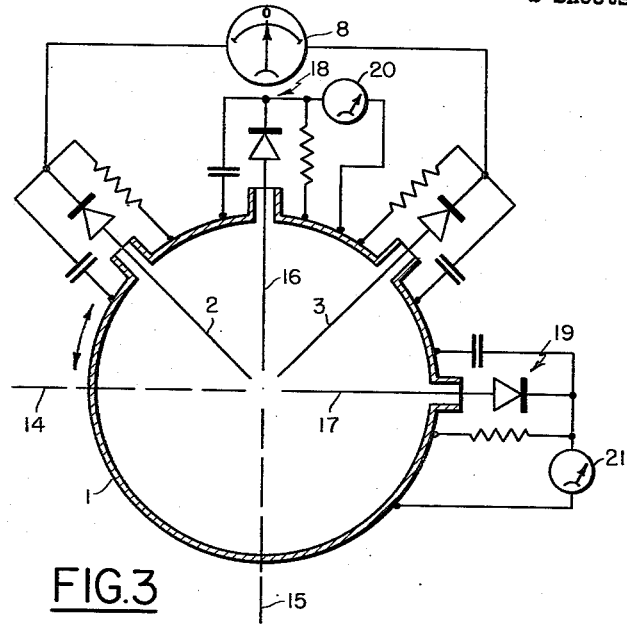
Figure 5:
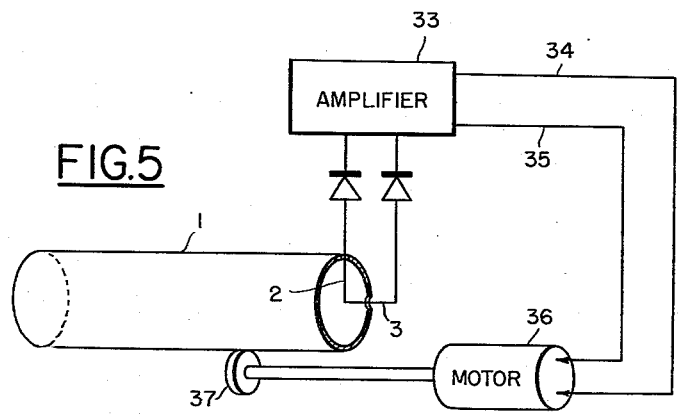
Figure 4:
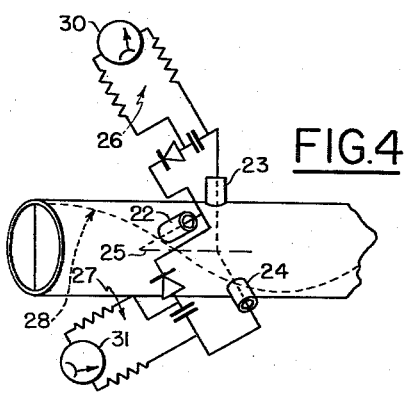

In the drawings:
FIG. 1 is a diagrammatic illustration in cross-section of one embodiment of this invention;
FIG. 2 is a modification thereof;
FIG. 3 is a similar illustration of another embodiment of this invention;
FIG. 4 is an illustration in diagrammatic form of still another embodiment of this invention; and
FIG. 5 is a block diagram of a servo mechanism incorporating the basic principles of this invention.

While the drawings illustrate the invention as being used in connection with wave guides or coaxial lines, it will be understood by a person skilled in the art that the basic principles of this invention may be used for detecting the polarized condition of a wave in free space.

With refeernce to FIG. 1, a conventional circular wave guide 1 is arranged to conduct a signal wave longitudinally thereof. At any suitable point along its length, and lying in a single plane which is normal to the axis of the wave guide, are two detecting devices or antenna probes 2 and 3 which converge at a point on the axis at an angle of ninety degrees or any other preferred angle. Suitable coaxial connections 4 and 5 provided for the two probes 2 and 3, respectively, conduct the signals induced therein externally of the wave guide.

Two crystal detectors, or any other suitable type detectors, 6 and 7, are coupled, respectively, to the coaxial stubs 4 and 5 and to opposite poles of a suitable current measuring instrument, indicated by the reference numeral 8. This instrument 8 is of conventional design, and preferably is of the two-coil differential measuring type wherein the two coils exert equal influence of opposite polarity on an indicating vane when subjected to equal direct currents. The needle on such an instrument is normally at rest on the center or zero point of the scale, and will move to either side of this point, depending upon the unbalance in currents applied to the respective coils.

Two condensers 9 and 10 are connected between the wave guide and the outer ends of the respective detectors 6 and 7, as are two suitable resistors 11 and 12.

Assuming that the wave guide 1 has been excited with a plane polarized wave, such wave as it passes the probes 2 and 3 will induce voltages therein in a manner conventionally understood. The values of these voltages will correspond to the respective angles between the plane of this wave and the two probes such that if these angles are different, correspondingly different voltages will be induced therein. It is well-known that this wave will retain its spatial position even thought the wave guide 1 may be rotated until the voltages induced in the two probes 2 and 3 are equal. The detectors 6 and 7 rectify these voltages to produce unidirectional signals which are coupled to the meter 8. If the currents from the two detectors 6 and 7 are equal, the meter 8 will indicate this balance by registering zero. Such a zero reading will occur when the voltages induced in the two probes 2 and 3 are equal, as occurs when the angles formed with the measured wave plane are equal.

This condition of equal probe voltages occurs when the wave is polarized in the planes indicated by the dashed lines 14 and 15. It will be noted that plane 15 bisects the angle between the two probes while the plane 14 is normal thereto.

Thus, by rotating the wave guide 1 until the meter 8 gives a zero reading, it is determined that the plane of the polarized wave coincides with one of the planes 14 or 15.

This ambiguity as between the two planes 14 and 15 is removed by the apparatus of FIG. 2. It is adapted for use with a coaxial line but is identical in fundamentals to the arrangement of FIG. 1 in the respects indicated by like reference numerals. In addition to the balance meter 8, two additional meters 11a and 12a are connected across the respective diodes 6 and 7. If balance is established by the instrument 8, meters 11a and 12a indicate equal currents. If the coaxial line is rotated slightly through a small angle in the direction of the arrow F, the current induced in probe 2 will be increased, and the reading of meter 11a will increase as well, if the polarization plane is 15. If the polarization is in plane 14, current in probe 2 and in meter 11a will decrease.

It will be understood by a person skilled in the art that the measurement achieved by use of meter 11a can be duplicated also through the sole use of meter 8 from the deflection of the needle to the right or left from the zero balance position.

This ambiguity as between the two planes 14 and 15 can be removed by the apparatus of FIG. 3 also. This apparatus is identical with that of FIG. 1 in the respects indicated by like reference numerals. In addition to the two probes 2 and 3 and the associated detecting and measuring circuitry, there are two additional probes 16 and 17 at right angles to each other and at angles of forty-five degrees (45°), respectively, with the probes 2 and 3, and are coupled to detector circuitry 18 and 19, respectively. This circuitry 18 and 19 may be similar to that used in connection with the individual probes 2 and 3.

Continuing with the operational example described in the foregoing, with the meter 8 reading zero, the two meters 20 and 21, which may be ordinary microammeters, are observed. It may be noted that one meter has a reading different from zero while the other remains at zero. It is this reading different from zero which provides coincidence-information as to the plane of wave polarization. For example, if the wave is in the plane coinciding with the probe 16, the meter 20 will provide a reading different from zero. The converse is true if the wave lies in the plane which coincides with the probe 17. This is true, since the probe which lies normal to the wave plane will have no voltage induced therein, while the probe which is coincident with the plane will have maximum voltage induced. Thus is provided a means for accurately determining the angle of a plane polarized wave.

By following the same operating technique, it is possible to determine the attitude of the major and minor axes of an elliptical wave propagating through the wave guide 1. The wave guide 1 of FIG. 3 is rotated until the meter 8 reads zero, and the meter 20 has a higher reading than the meter 21. Th major axis thereby coincides with the probe 16, while the minor axis coincides with the probe 17. If the two circuits 18 and 19 are identical, the two readings of the meters 20 and 21 will provide the ratio of ellipticity.

If the wave propagating through the wave guide 1 is circularly polarized, it is obvious that all of the probes 2, 3, 16 and 17 will have equal voltages induced therein such that it is immediately determined that the wave detected is of such polarized form. However, it is desirable to know the direction of rotation of the wave, whereupon attention is directed to a further embodiment of this invention as illustrated in FIG. 4. Here again, like numerals will indicate like parts. In addition to the probe arrangement and circuitry of FIG. 1, three additional probes 22, 23 and 24 are radially oriented inside the wave guide 1 in two axially spaced planes normal to the direction of wave propagation. For completing the conductive circuit therebetween, a conductor 25 is connected between the inner ends of the probes 22 and 23 and 24. Two detecting circuits, indicated generally by the reference numerals 26 and 27, respectively, are coupled between probes 22, 23 and 22, 24. As is known, the instantaneous field distribution defined by a circularly propagating wave resembles a longitudinally twisted ribbon. Such a distribution is illustrated in FIG. 4 by the helical line 28, which is traced over the periphery of the wave guide, and it will be noted that at the instant illustrated the two probes 22 and 24 lie in the surface of the wave helix. The propagation of this circularly polarized wave is characterized by a uniform proceeding of this helical field distribution in the direction of the wave guide axis. Probes 22 and 24 do not coincide with the helix surface until the wave proceeds one full wavelength. The important fact is however that the relative position of probe 22 to the helix is always the same as that of probe 24. This being true, at every instant equal voltages will be induced in the two probes 22 and 24 whereupon the current in the detector circuit 27 will be zero. The reading of the meter 31 will therefore be zero, while it will be different from zero in the detector circuit 26 and meter 30. Thus it is seen that with the probes 22 and 24 spaced axially apart and angularly related such that they will coincide with the plane of the circular, clockwise rotating wave, and the probe 23 positioned out of such coincidence, means are provided for determining the direction of wave rotation. If the wave were rotating oppositely, the probes 22 and 24 could not coincide with or be equally spaced from the helical path, whereupon there would be some voltage difference induced therein while none in probes 22 and 23. This unbalance in voltages would result in the application of a current to the meter 31, while no current would be applied to the meter 30.

The basic concept of the foregoing, that is, the determination of wave polarization, may be incorporated in a servo mechanism of FIG. 5. Here again, like numerals will indicate like parts. The wave guide 1 is mounted for free rotation about its axis. First assume that a signal wave polarized in the vertical plane enters the waveguide 1. This wave will excite the two probes 2 and 3, as explained previously, which in turn supply two unidirectional signals to a suitable amplifier 33. This amplifier augments the signals of the respective probes 2 and 3 and couples the individual augmented signals by means of circuits 34 and 35, respectively, to a reversible servo motor 36. This motor 36 is equipped with a driving spindle 37 frictionally engaged with the outer surface of the wave guide 1 for imparting rotary motion to the latter.

In operation, if the signal of probe 2 is greater than that of probe 3, the amplified signal in the corresponding circuit 34 will be greater than that in 35. The motor 36 will thereupon operate in a sense to cause rotation of the spindle 37 and the wave guide 1 in a direction which will move probe 3 toward probe 2. When rotation of the two probes is such as to produce equal signals, equal signals will be applied over circuits 34 and 35 to the motor 36 which causes the latter to halt. By observing the physical position of the two probes 2 and 3, it will be known that the plane of polarization bisects the angle between probes 2 and 3.

While there has been described what is at present considered the preferred embodiment of the invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. In a system for detecting the polarization and direction of rotation of a circularly polarized wave, the combination comprising a circular waveguide for conducting a single signal wave axially thereof, means for determining the direction of rotation of a circularly polarized wave comprising, two antenna probes disposed in a single plane which is normal to the axis of said waveguide, said probes being situated internally of said waveguide and coinciding with imaginary lines which intersect said axis and which are disposed at a predetermined angle to each other, a third antenna probe disposed internally of said waveguide and in a plane which is normal to the axis of said waveguide and spaced axially from said first-mentioned plane, said third antenna probe coinciding with an imaginary line which intersects said axis and is disposed at a predetermined angle to each of the other two antenna probes, the spacing between said planes and the angle between said lines establishing the position of one of said first two antenna probes and the third antenna probe at equal electric field intensity points and the position of the other of said first two antenna probes at a point of different electric field intensity.

2. Wave polarization detecting apparatus comprising a circular waveguide for conducting a signal wave axially thereof, a first antenna probe disposed in a plane normal to the axis of said waveguide, second and third antenna probes disposed in a plane normal to the axis of said waveguide and spaced at a fixed distance along said axis from said first-mentioned plane, each of said probes being situated internally of said waveguide and coinciding with imaginary lines which intersect said axis at predetermined angles to each other, the spacing between said first and second planes and the angle between said first and second probes and said first and third probes being such as to dispose said first and second probes at equal field intensity points when a wave is rotating in one direction and to dispose said first and third probes at equal field intensity points when said wave is rotating in a different direction.

3. Wave polarization detecting apparatus comprising a circular waveguide for conducting a signal wave axially thereof, a first antenna probe lying in a plane which is normal to the axis of said waveguide, a second and a third probe lying in a second plane spaced axially from said first plane and which is parallel thereto, each of said probes being situated internally of said waveguide and coinciding with imaginary lines which intersect said axis, the first of said antenna probes being connected to the second and the third antenna probes, respectively, by series circuits composed of a diode and a capacitor, each of the capacitors being shunted by a series circuit comprising a resistor and an indicating means, the probes being disposed at an angle to each other, the spacing between said planes and the angle between said lines being such as to dispose said first and second probes at equal electric field intensity points when a wave is rotating in a first direction and to dispose said first and third probes at equal electric field intensity points when said wave is rotating in a second direction.

References Cited in the file of this patent
UNITED STATES PATENTS

| | | |
|---|---|---|
| 2,257,783 | Bowen | Oct. 7, 1941 |
| 2,556,377 | Robertson | June 13, 1951 |
| 2,702,366 | Ginzton | Feb. 15, 1955 |
| 2,723,377 | Cohn | Nov. 8, 1955 |
| 2,759,099 | Olive | Aug. 14, 1956 |